United States Patent [19]

Majima

[11] Patent Number: 5,235,446
[45] Date of Patent: Aug. 10, 1993

[54] PROJECTION TYPE LIQUID CRYSTAL DISPLAY APPARATUS WITH PIXELS OF ONE PANEL

[75] Inventor: Kenji Majima, Tenri, Japan

[73] Assignee: Sharp Kabushiki Kaisha, Osaka, Japan

[21] Appl. No.: 892,689

[22] Filed: May 27, 1992

Related U.S. Application Data

[63] Continuation of Ser. No. 478,073, Feb. 9, 1990, abandoned.

[30] Foreign Application Priority Data

Feb. 9, 1989 [JP] Japan ................................. 1-30703

[51] Int. Cl.$^5$ .................... G02F 1/133; G02F 1/1343; G02F 1/13
[52] U.S. Cl. ............................. 359/53; 359/61; 359/102
[58] Field of Search ............ 350/336, 335; 359/53, 359/61, 102

[56] References Cited

U.S. PATENT DOCUMENTS

| | | | |
|---|---|---|---|
| 4,231,640 | 11/1980 | Funada et al. | 350/336 |
| 4,335,936 | 6/1982 | Nonomura et al. | 350/336 |
| 4,904,058 | 2/1990 | Kajo et al. | 350/337 |
| 4,904,061 | 2/1990 | Aruga | 359/40 |
| 4,952,036 | 8/1990 | Gulick et al. | 350/336 |
| 5,054,910 | 10/1991 | Kozaki et al. | 359/53 |

FOREIGN PATENT DOCUMENTS

| | | | |
|---|---|---|---|
| 0186086 | 7/1986 | European Pat. Off. | 350/334 |
| 0284372 | 9/1988 | European Pat. Off. | |
| 0153599 | 12/1979 | Japan | 350/335 |
| 0009636 | 1/1984 | Japan | 350/336 |
| 0190315 | 8/1986 | Japan | 350/336 |
| 0089935 | 4/1987 | Japan | 350/336 |
| 1-134336 | 5/1989 | Japan | 350/336 |

OTHER PUBLICATIONS

Patent Abstracts of Japan (Jul. 13, 1989) 13(306):P-897.
Morozumi et al., *SID 86 Digest* (1986) pp. 375-378.

Primary Examiner—William L. Sikes
Assistant Examiner—Anita Pellman Gross
Attorney, Agent, or Firm—Morrison & Foerster

[57] ABSTRACT

A projection type liquid crystal display apparatus comprising a plurality of laminated liquid crystal panels, each of which has a twisted nematic type liquid crystal layers and voltage applying means for modulating light that has passed through the liquid crystal layer by one display element unit, wherein the twisting direction of the liquid crystal molecules of the liquid crystal layer of one of the adjacent liquid crystal panels is opposite to that of the liquid crystal layer of the other liquid crystal panel; the orientation of the liquid crystal molecules of the liquid crystal layer of the first one liquid crystal panel in the vicinity of the liquid crystal layer of the other liquid crystal panel is approximately perpendicular to that of the liquid crystal molecules of the liquid crystal layer of the other liquid crystal panel in the vicinity of the liquid crystal layer of the first one liquid crystal panel; and the respective voltage applying means of each of the liquid crystal panels are provided with picture element electrodes that are disposed in a zigzag manner so that the picture elements of the first one liquid crystal panel are not superposed on those of the other liquid crystal panel in the light transmitting direction, whereby the opening ratio of the display apparatus becomes high and the display capacity can be increased.

9 Claims, 7 Drawing Sheets

PROJECTION TYPE LIQUID CRYSTAL DISPLAY APPARATUS WITH PIXELS OF ONE PANEL

This application is a continuation of application Ser. No. 478,073, filed Feb. 9, 1990, now abandoned.

BACKGROUND OF THE INVENTION

1. Field of the Invention

The present invention relates to a projection type liquid crystal display apparatus for displaying a large quantity of character information and various other images, and more particularly to a projection liquid crystal display apparatus which projects, onto a screen, light transmitted a plurality of twisted nematic type liquid crystal layers so as to perform a display of enlarged images.

2. Description of the Prior Art

A projection type liquid crystal display apparatus using a plurality of twisted nematic type liquid crystal panels has been developed as a liquid crystal apparatus for displaying a large quantity of character information and/or various images. FIG. 5 is a conventional projection type liquid crystal display apparatus, which has a double-layer liquid crystal display element 6 composed of a pair of laminated liquid crystal panels 60 and 70. Light from a light source 31 enters into a converging lens 32 by which the light is made parallel, and then projected onto the liquid crystal panel 60, in which the light is modulated to a predetermined display pattern transmitted to the other liquid crystal panel 70. The light reaches a screen 35 through a projection lens 34 by which an enlarged image is displayed onto the screen 35.

The liquid crystal panel 60 positioned at the light source 31 side, as shown in FIG. 6, comprises a twisted nematic type liquid crystal layer 61 that is sandwiched between a pair of substrates 62 and 63. The other liquid panel 70 positioned at the screen 35 side comprises a twisted nematic type liquid crystal layer 71 that is sandwiched between a pair of substrates 72 and 73, as well.

The liquid crystal layer 61 at the liquid crystal panel 60 at the light source 31 side is a liquid crystal called an STM (super twisted nematic) or SBE (supertwisted birefringence effect) type of the liquid crystal molecules, that has an angle of twist 180° to 270°. The liquid crystal molecules of the liquid crystal layer 71 of the other liquid crystal panel 70 at the screen 85 side is of the STN (or SBE) type that has a twisting direction that is reverse to that of the liquid crystal molecules of the liquid crystal layer 61 of liquid crystal panel 60. The orientation of the liquid crystal molecules of one of the liquid crystal layers 61 and 71 in the vicinity of the other liquid crystal layer is at an angle of about 90° to that of the liquid crystal molecules of the other liquid crystal layer in the vicinity of the first one liquid crystal layer.

The liquid crystal layer 61 of the liquid crystal panel 60 at the light source 31 side is operated by a multiplex drive. As shown in FIG. 7, a large number of transparent scanning electrodes 64 that extend in parallel to each other are disposed on the substrate 62 that constitutes the liquid crystal panel 60. The respective scanning electrodes 64 being connected to a scanning side drive circuit 66 and being all driven by the drive circuit 66. On the other substrate 63 opposite to the substrate 62 across the liquid crystal layer 61 are disposed a large number of signal electrodes 65 that are positioned so as to be perpendicular to the scanning electrodes 64, respectively. A predetermined voltage is selectively applied to each of the signal electrodes 65 by scanning side drive circuits 67a and 67b.

However, on the contrary, the substrates 72 and 73 at the liquid crystal panel 70 disposed at the screen 35 side are not provided with such electrodes.

With such a liquid crystal display apparatus, a voltage is sequentially selectively applied to each of the scanning electrodes 64 of the liquid crystal panel 60 at the light source 31 side by the scanning side drive circuit 66. A voltage is selectively applied to a predetermined signal electrode 65 on the basis of a display pattern by means of a signal side drive circuit 67a or 67b. The transmitted light is modulated in the portion (a picture element) of the liquid crystal layer 61 corresponding to an intersection of both electrodes to which a voltage has been applied. The light that has been transmitted through the liquid crystal panel 60 is then transmitted through the liquid crystal panel 70 at the screen 35 side. The liquid crystal panel 70 compensates the coloration of light that has been transmitted through the liquid crystal layer 61 of the liquid crystal panel 60, the coloration being caused by the birefringence effect of the liquid crystal layer 61.

A conventional display apparatus with the above-mentioned structure enables the scanning electrodes 64 to scan in 400 lines by, for example, 1/200 duty drive.

It is required that liquid crystal display apparatuses have picture elements with a high density so as to increase the capacity of display. The above-mentioned conventional liquid crystal display apparatus that attains the aforesaid multiplex drive, when the number of the scanning electrodes are increased, so that the picture elements can be highly densified, creates a problem in that a sufficient voltage is not applied to a picture element of the liquid crystal, and the contrast of the resulting display or the response speed is lowered, resulting in a remarkably deteriorated display quality. When non-linear devices, such as diodes, or switching devices such as thin film transistors are added to each of the liquid crystal picture elements, the above-mentioned lowering of the contrast or the response speed can be prevented, but an opening ratio, that is a ratio of the area of the picture elements to the area of the display surface of the liquid crystal layer is lowered, which is considered to be disadvantageous in an economical aspect. Moreover, in a direct visual type liquid crystal display apparatus, different from the above-mentioned projection liquid crystal display apparatus, which comprises a plurality of laminated liquid crystal layers each of which is provided with a voltage applying means, parallax arises in each of the display portions of the laminated liquid crystal layers, which makes it impossible to perform a continuous display, causing the lowering of the quality of the display. Moreover, a conventional projection liquid crystal display apparatus with the above-mentioned electrode disposition (electrode pattern), gaps exist between the electrode (between the picture elements), and accordingly it is difficult to obtain a wide opening ratio when the picture elements are highly densified.

SUMMARY OF THE INVENTION

The projection type liquid crystal display apparatus of this invention, which overcomes the above-discussed and numerous other disadvantages and deficiencies of the prior art, comprises a plurality of laminated liquid crystal panels, each of which has a twisted nematic type liquid crystal layers and voltage applying means for modulating light that has passed through said liquid crystal layer by one display element unit, wherein the twisting direction of the liquid crystal molecules of said liquid crystal layer of one of the adjacent liquid crystal panels is opposite to that of the liquid crystal layer of the other liquid crystal panel; the orientation of the liquid crystal molecules of said liquid crystal layer of the first one liquid crystal panel in the vicinity of said liquid crystal layer of the other liquid crystal panel is approximately perpendicular to that of the liquid crystal molecules of said liquid crystal layer of the other liquid crystal panel in the vicinity of said liquid crystal layer of the first one liquid crystal panel; and said respective voltage applying means of each of said liquid crystal panels are provided with picture element electrodes that are disposed in a zigzag manner so that the picture elements of the first one liquid crystal panel are not superposed on those of the other liquid crystal panel in the light transmitting direction.

In a preferred embodiment, the picture element electrodes comprise a plurality of signal electrodes that are disposed to extend in the same direction on one of a pair of substrates that sandwiches therebetween said liquid crystal layer of each of said liquid crystal panels and a plurality of scanning electrodes that are disposed to perpendicularly intersect said signal electrodes on the other substrate. Each of said signal electrodes has electrode portions that are spaced at a predetermined interval in the extending direction of each of said signal electrodes and are shaped into the shape of one picture element unit; and said electrode portions of said signal electrode shift from the corresponding electrode portions of the adjacent signal electrode to an extent corresponding to one picture element unit in the extending direction of each signal electrode. Said scanning electrodes are disposed in a zigzag manner and sequentially superposed on the corresponding electrode portions of said signal electrodes that shift from each other in the extending direction of said signal electrodes so as to sandwich said liquid crystal layer therebetween.

In a preferred embodiment, the number of liquid crystal panels is two, so as to constitute one liquid crystal display element, whereby a black-and-white display is performed. Alternatively, the number of liquid crystal panels are six so as to constitute a three liquid crystal display element, whereby a color display is performed.

Thus, the invention described herein makes possible the objectives of (1) providing a projection type liquid crystal display apparatus that has a high opening ratio and an increased display capacity; (2) providing a projection type liquid crystal display apparatus that attains an image display of high resolution; and (3) providing a projection type liquid crystal display apparatus that attains a high quality display.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 2:
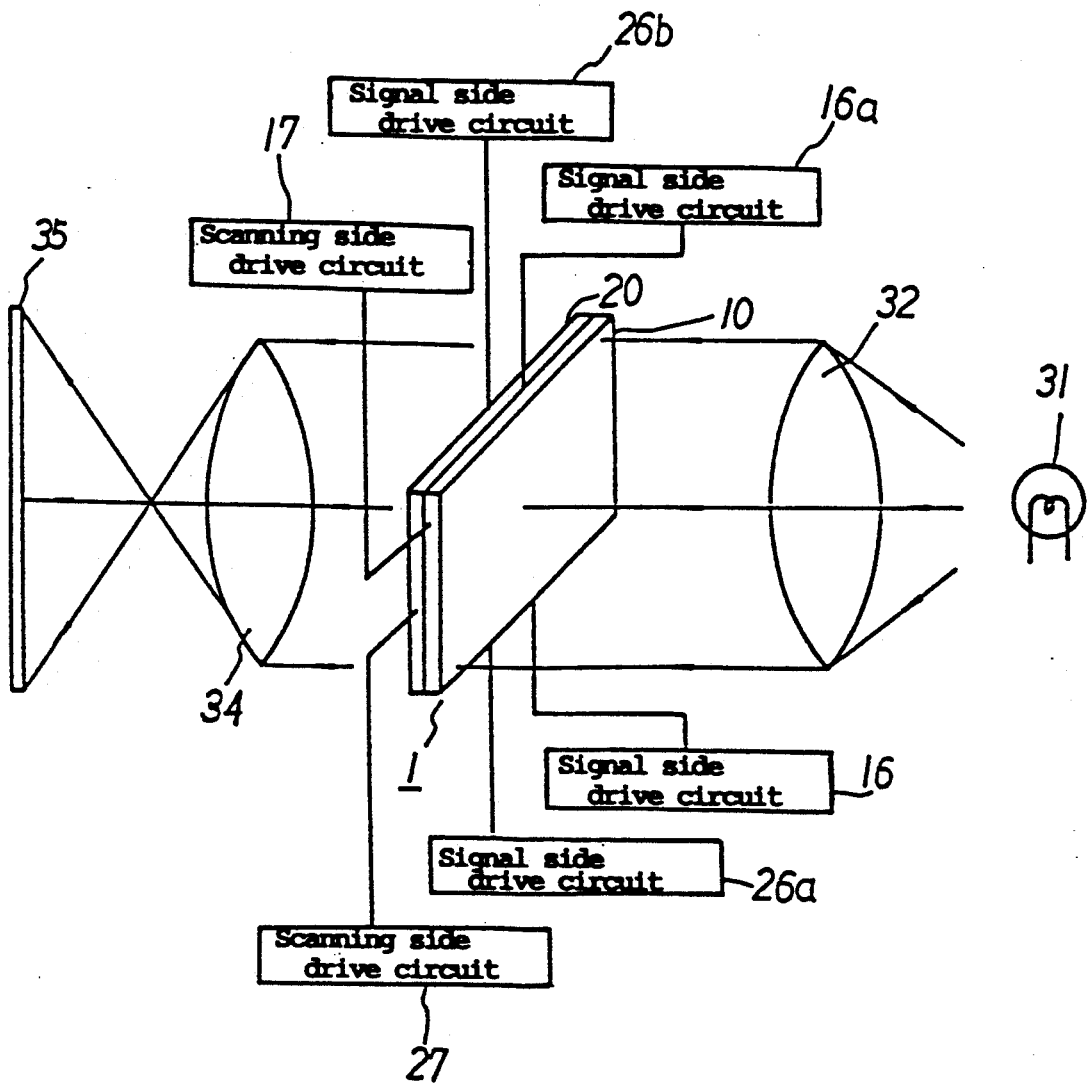
FIG. 2 is a schematic diagram showing the projection type liquid crystal display apparatus.

FIG. 2 shows a liquid crystal display apparatus of the present invention, which comprises a liquid crystal display element 1 composed of a pair of liquid crystal panels 10 and 20. Light emitted from the light source 31 is made parallel by a converging lens 32 and projected to the liquid crystal display element 1. The light that is transmitted through the liquid crystal display element is projected onto a screen 35 by a projection lens 34.

Figure 1:
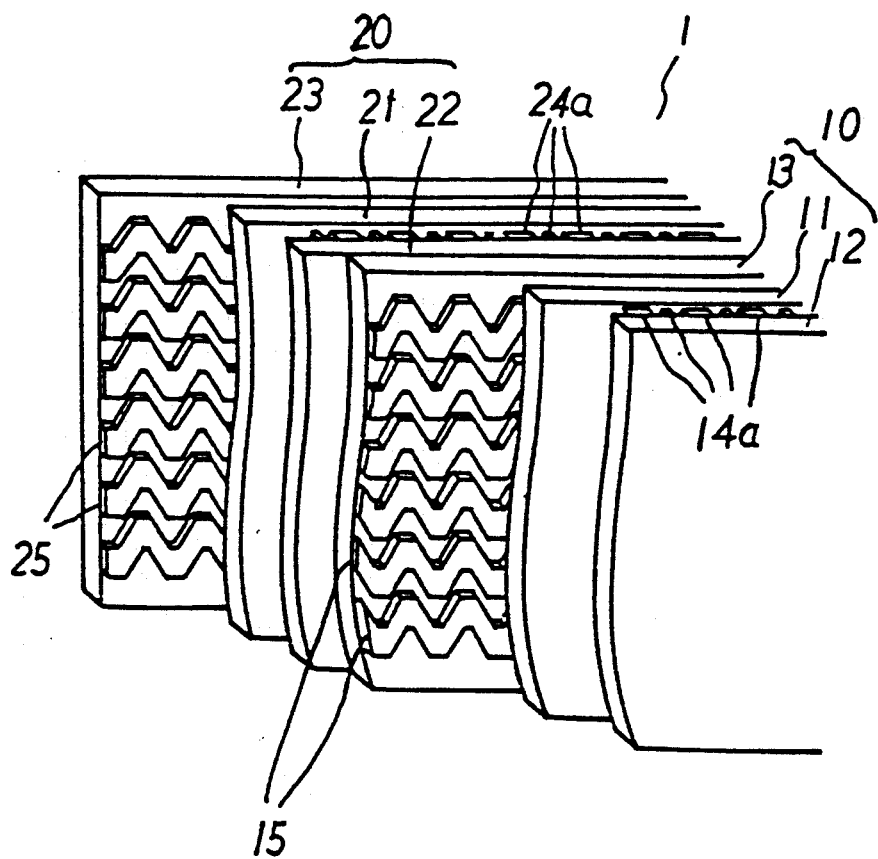
FIG. 1 is a sectional perspective view showing the portion of a liquid crystal display element of a projection type liquid crystal display apparatus of this invention.

The liquid crystal display element 1, as shown in FIG. 1, is so constructed that one liquid crystal panel 10 is vertically provided at the light source 31 side, the other liquid crystal panel 20 being vertically provided at the screen 35 side. The liquid crystal panel 10 at the light source 31 side has a twisted nematic liquid crystal layer 11, which is sandwiched between a pair of transparent substrates 12 and 13, the twisted nematic liquid crystal layer 21 at the screen 35 side of the liquid crystal panel 20 being sandwiched between a pair of transparent substrates 22 and 23, as well.

The liquid crystal layer 11 of the liquid crystal panel 10 is of an STN or SBE type having liquid crystal molecules, the angle of twist of which is about 180° to 270° C. The liquid crystal layer 21 of the liquid crystal panel 20 is of an STN or SBE type, and the twisting direction of liquid crystal molecule thereof is reverse to that of the liquid crystal layer 11 of the liquid crystal panel 10. The orientation of the liquid crystal molecules of either one of the liquid crystal layers 11 and 21 in the vicinity of the other liquid crystal layer is at an angle of about 90° to that of the liquid crystal molecules of the other liquid crystal layer in the vicinity of the first one. Accordingly, the coloration caused by the birefringence effect of the light that passes through either one of the liquid crystal layers 11 and 21 of the liquid crystal panels 10 and 20 is optically compensated by the liquid crystal layer of the other liquid crystal panel.

Figure 3A:
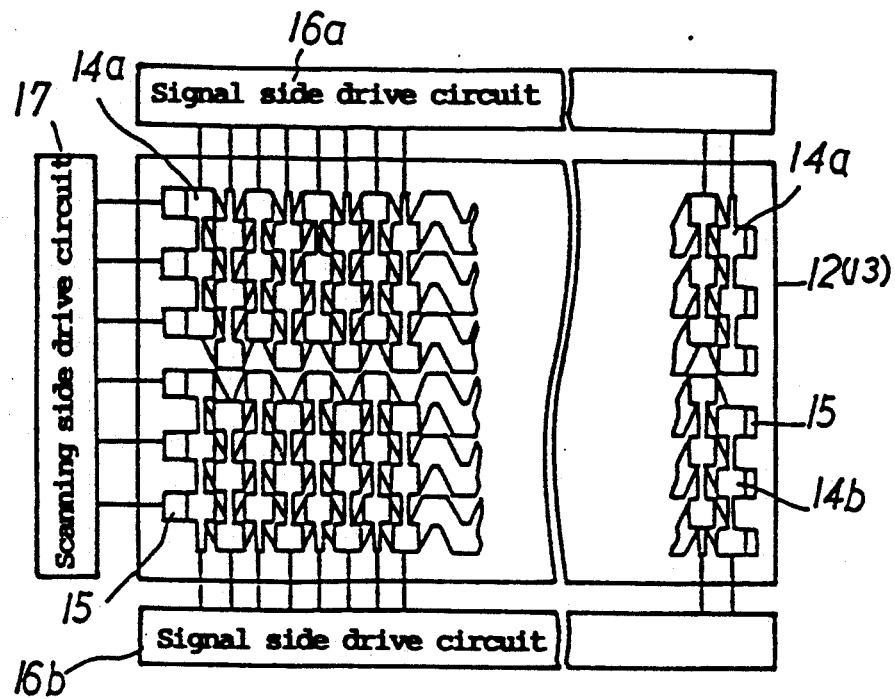
FIGS. 3a-3f, respectively, are schematic diagrams showing the positioned relationship between the electrodes and the picture elements of each liquid crystal panel of the liquid crystal display element.

On the substrate 12 at the light incident side of the liquid crystal panel 10 at the light source 31 side, a large number of transparent signal electrodes 14a and 14b, which have shapes extending in the vertical direction such as those shown in FIG. 3a, are disposed. Each signal electrode 14a is disposed on the upper half of the surface of the liquid crystal layer 11 of the substrate 12 in such a way that the square electrode portions forming the signal electrode 14a, each of which corresponds to one picture element unit of the liquid crystal layer 11, vertically shift from the corresponding electrode portions of the adjacent signal electrode to an extent corresponding to one picture element unit. The adjacent electrode portions are connected to each other by means of thin wires. Also, the adjacent electrode portions of the signal electrodes 14a, as shown in FIG. 3c, are disposed in a zigzag manner and vertically shift to an extent corresponding to one picture element unit. The other signal electrodes 14b are disposed on the lower half of the substrate so as to line up with the corresponding signal electrodes 14a. The adjacent signal electrodes 14b are connected to each other by means of thin wires in such a way that square electrode portions forming the signal electrode 14b, each of which corresponds to one picture element, vertically shift to an extent corresponding to the said square electrode portion. A voltage is selectively applied to each signal electrode 14a disposed in the upper portion of the substrate 12 by a signal side drive circuit 16a so as to perform a given display. A voltage is also applied selectively to each signal electrode 14b by a signal side drive circuit 16b so as to perform a given display.

Figure 3B:
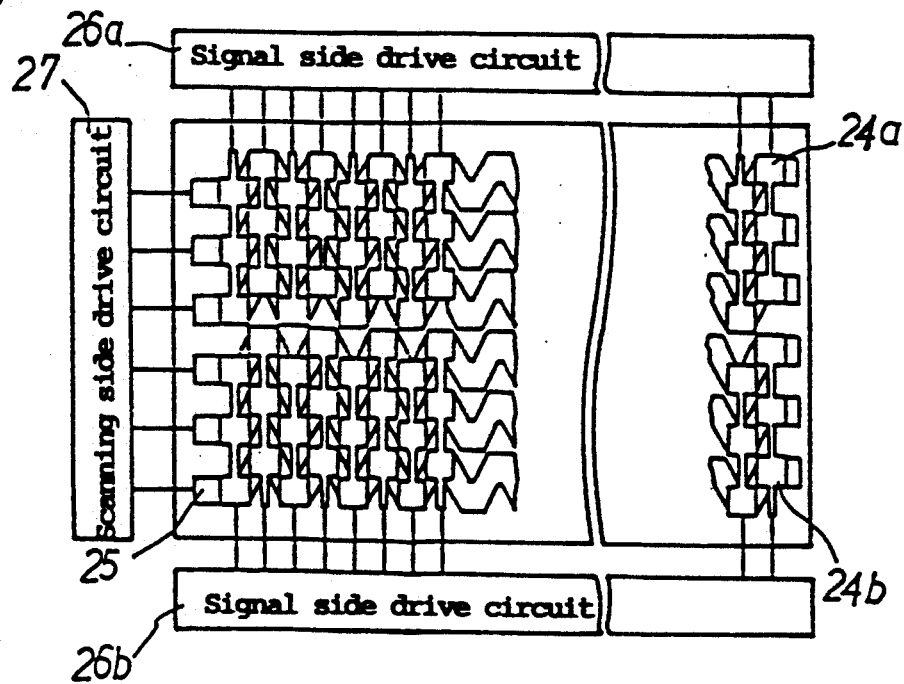
Figure 3C:
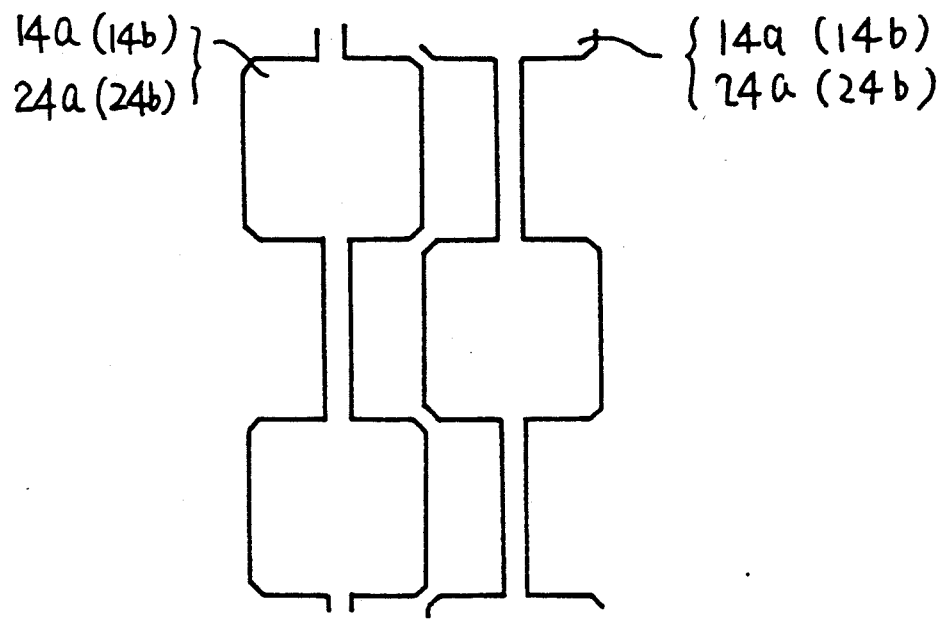
Figure 3D:
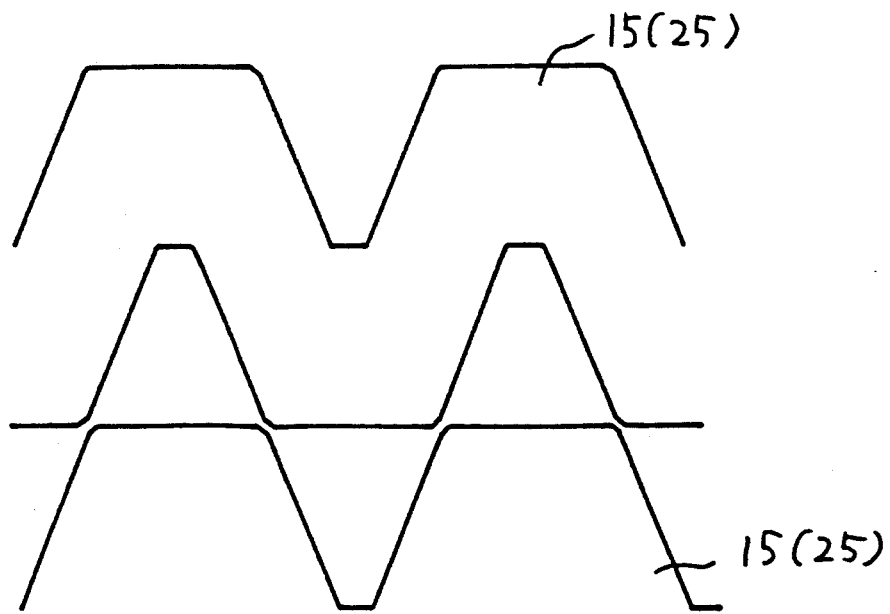
Figure 3E:
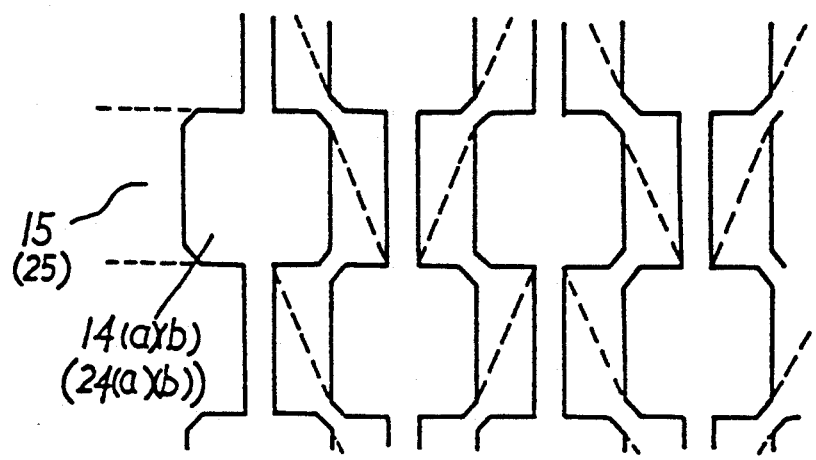

On the surface of the substrate 13 at the liquid crystal layer 11 side that is opposite to the substrate 12 across the liquid crystal layer 11, a large number of scanning electrodes 15, which have shapes such as those shown in FIG. 3d, are disposed corresponding to the electrode portions of each of the signal electrodes 14a and 14b, respectively. Each scanning electrode 15 is disposed in a zigzag manner to laterally extend so as to perpendicularly intersect each signal electrode 14a or 14b. The adjacent scanning electrodes 15 are parallel and disposed in a zigzag manner to each other. FIG. 3e shows the positional relationship between the signal electrodes 14a and 14b and the scanning electrodes 15, each scanning electrode 15 being sequentially superposed on the electrode portions of each of the signal electrodes 14a and 14b so as to sandwich the liquid crystal layer 11 therebetween. A voltage is sequentially selectively applied to each scanning electrode 15 by a scanning side drive circuit 17. In this way, a voltage is applied to a portion (a picture element) of the liquid crystal layer 11 that is sandwiched between the scanning electrode 15 of the substrate 13 to which a voltage has been applied and the electrode portion of the signal electrode 14a or 14b of the substrate 12 to which a voltage has been applied, and thus light passing through the picture element is modulated.

On the other hand, the substrate 22 disposed at the light incident side (at the liquid crystal panel 10 side) of the liquid crystal panel 20 are provided with a large number of transparent signal electrodes 24a and 24b that have shapes such as those shown in FIG. 3b. The signal electrodes 24a are disposed on the upper half of the substrate 22 at the liquid crystal layer 11 side in the same pattern as that of the signal electrodes 14a (FIG. 3c) disposed on the substrate 12 at the light incident side. The signal electrodes 24b are disposed on the lower half of the substrate 12 so as to line up with the corresponding signal electrodes 24a in the same pattern as that of the signal electrodes 14b disposed on the substrate 12 at the light incident side. A voltage is selectively applied to the signal electrodes 24a at the upper portion of the substrate 22 by a signal side drive circuit 26a so as to drive a given display. A voltage is selectively applied to the signal electrodes 24b by a signal side drive circuit 26b so as to drive a given display.

As shown in FIG. 1, on the surface of the substrate 23 at the liquid crystal layer 11 side that is opposite to the substrate 22 across the liquid crystal layer 21, a large number of scanning electrodes 25, which have shapes such as those shown in FIG. 3d, are disposed corresponding to the electrode portions of each of the signal electrodes 24a and 24b. Each scanning electrode 25 is disposed in a zigzag manner in as the same way as that of each scanning electrode 15 of the substrate 13. FIG. 3e shows the positional relationship between the electrodes 24a and 24b and the electrodes 25, in which each scanning electrode 25 is sequentially superposed on the electrode portions of each of the signal electrodes 24a and 24b so as to sandwich the liquid crystal layer 21 therebetween. A voltage is sequentially selectively applied to the scanning electrodes 25 by a scanning side drive circuit 27. In this way, a voltage is applied to a portion (a picture element) of the liquid crystal layer 21 that is sandwiched between the scanning electrode 25 of the substrate 23 to which a voltage has been applied, and the electrode portion of the signal electrode 24a or 24b of the substrate 23 to which a voltage has been applied, and thus light passing through the picture element is modulated.

Figure 3F:
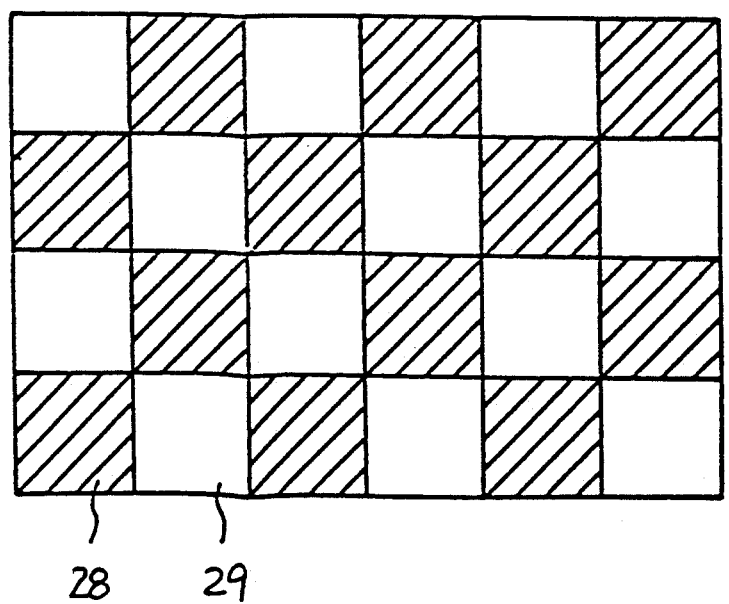

The electrode portions of each of the signal electrodes 14a and 14b of the liquid crystal panel 10 are not superposed on the electrode portions of each of the signal electrodes 24a and 24b of the liquid crystal panel 20. Accordingly, as shown in FIG. 3f, the picture elements 28 of the liquid panel 10 and the picture elements 29 of panel 20 are positioned in a zigzag manner and not superposed on each other in the light transmission direction. The picture elements 28 and 29 that are vertically laterally adjacent to each other are picture elements of other liquid crystal panels, respectively.

In the liquid crystal display apparatus having the above-mentioned structure, voltages are applied to given picture elements of the liquid crystal layers 11 and 21 of the liquid crystal panels 10 and 20 by means of the scanning electrodes 15 and 25 and the signal electrodes 14a, 14b, 24a and 24b, and thus light passing through the picture element is modulated. Light emitted from the light source 31 enters in a parallel manner into the liquid crystal element 1 through the converging lens 32 and passes through picture elements of the liquid crystal layers 11 and 21, and then is projected onto the screen 35 by the projection lens 34, resulting in a predetermined image on the screen 35.

Since the picture elements of the liquid crystal layers 11 and 21 to which voltages are applied are not superposed on each other in the light transmitting direction, non-picture element portions of either one of the liquid crystal layers 11 and 21 compensate the optical phase of the picture element of the other liquid crystal layer 21 or 11. Therefore, the coloration of the transmitted light caused by the birefringence effect in the picture element region of the liquid crystal layer 11 at the light source 31 side is optically compensated by the non-picture-element region of the liquid crystal layer 21 at the screen 35 side. Likewise, the coloration caused by the birefringence effect in the non-picture-element region of the liquid crystal layer 11 at light source 31 side is optically compensated in the picture element region of the liquid crystal layer 21, so that an image, the contrast ratio of which is very high, is projected onto the screen 35.

Voltages are individually applied to the scanning electrodes 15 and 25 disposed on the substrates 13 and 23 of the liquid crystal panels 10 and 20 by the scanning side drive circuits 17 and 27 respectively, so that the display capacity can be increased without increasing the number of scanning electrodes of both liquid crystal panels 10 and 20 beyond that of scanning electrodes of a conventional liquid crystal display element and without lowering the responsiveness.

As a result, the opening ratio of the picture elements becomes high and an image display obtained is bright and superior in contrast.

Figure 4:
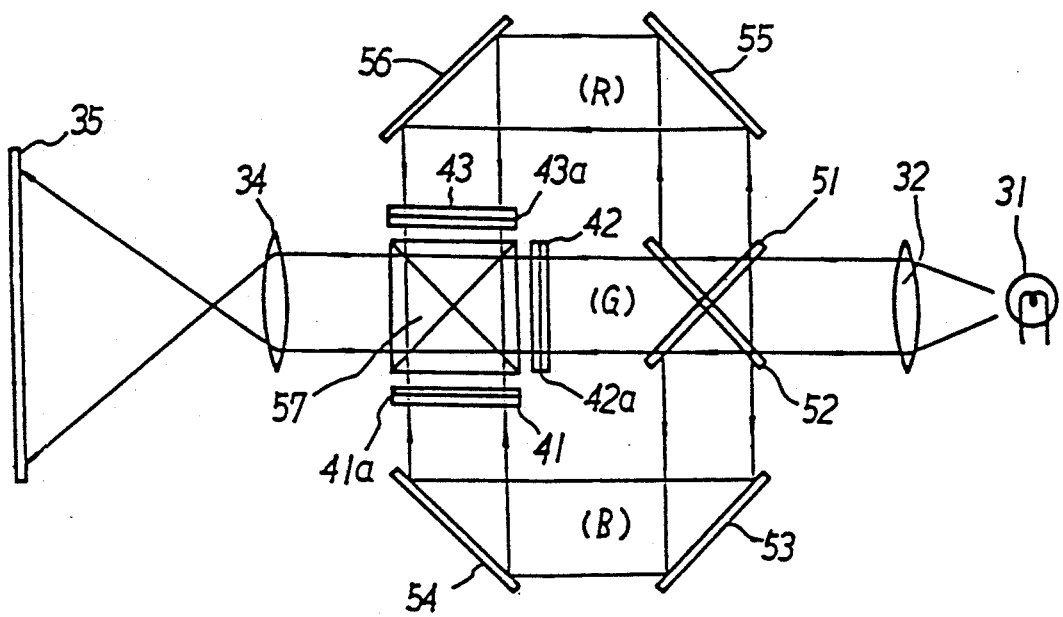
FIG. 4 is a schematic diagram showing a color liquid crystal display apparatus of this invention.
Figure 5:
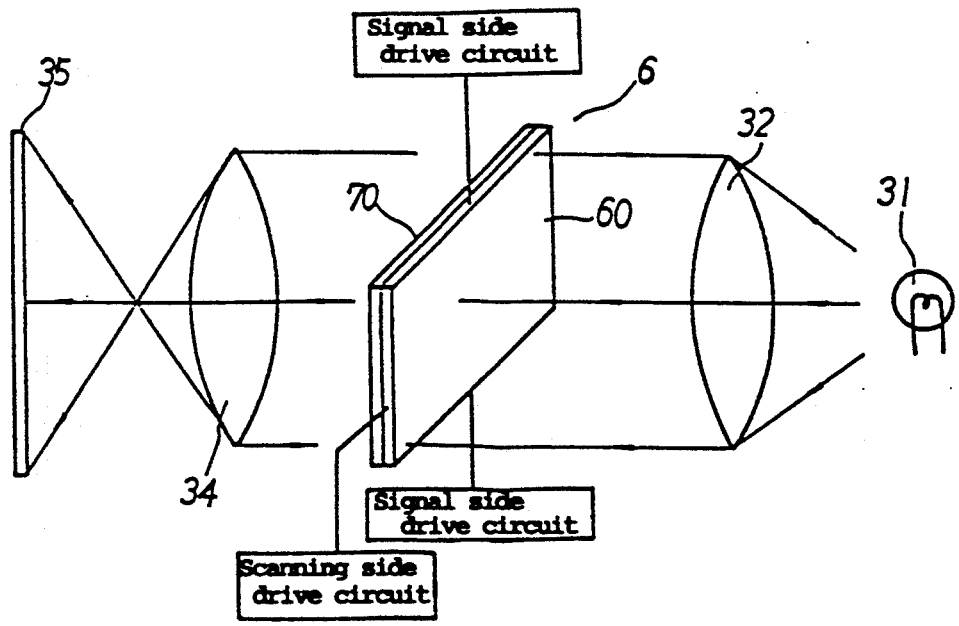
FIG. 5 is a schematic diagram showing a conventional projection type liquid crystal display apparatus.
Figure 6:
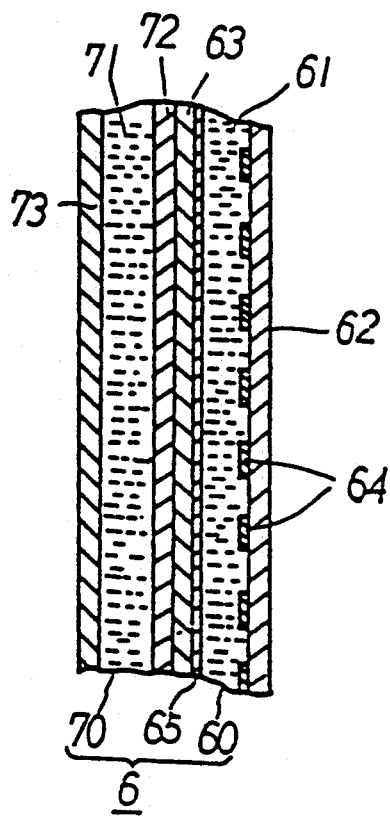
FIG. 6 is a sectional view showing a liquid crystal display element of the conventional projection type liquid crystal display apparatus.
Figure 7:
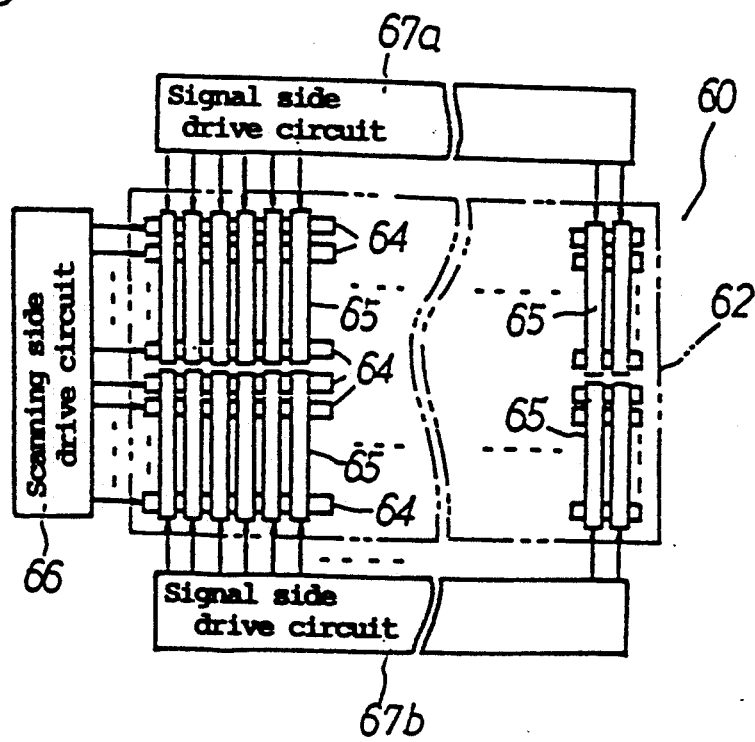
FIG. 7 is a schematic diagram showing the disposition of the electrode of a liquid crystal panel of the liquid crystal display element of FIG. 6.

Although the above-mentioned example only discloses a black-and-white display liquid crystal display apparatus, the present invention is applicable to a color display liquid crystal display apparatus. FIG. 4 shows a liquid crystal display for color display of the present invention, in which light from a light source 31 is made parallel by a converging lens 32 enters into a blue reflection type dichroic mirror 51 and a red reflection type dichroic mirror 52, by which the light from the light source is decomposed into blue (B), red (R) and green (G), and divided in the three directions. The green (G) light passes through both the dichroic mirrors 51 and 52 and is incident upon a dichroic prism 57 through a liquid crystal display element 42. The blue (B) light is perpendicularly reflected by the dichroic mirror 51, after which the course thereof is changed by reflectors 53 and 54, and is incident upon the dichroic prism 57 through a liquid crystal display element 41. The red (R) light is perpendicularly reflected by the dichroic mirror 52, after which the course thereof is changed by reflectors 55 and 56, and is incident upon the dichroic prism 57 through a liquid crystal display element 43. The liquid crystal display elements 41 to 43 through which the light rays that are incident upon the dichroic prism 57 pass have the same structure as that of the liquid crystal display element 1 shown in FIG. 1 and have the same function as that thereof. The respective color light rays that are incident on the dichroic prism 57 through the liquid crystal display elements 41 through 43 are put together by the dichroic prism 57 and then projected onto the screen 35, resulting in a desired color image on the screen 35.

Although the above-mentioned examples only disclose a liquid crystal display element composed of a two-layered display panel, this invention is applicable to a liquid crystal display element composed of two or more sets of a pair of liquid crystal panels in which a portion of the liquid crystal layer corresponding to the voltage applying means of one substrate optically compensates a portion of the liquid crystal layer corresponding to the voltage applying means of the other substrate. In this case, likewise, the voltage applying means of one substrate are not superposed on those of the other substrate in the light transmitting direction, and accordingly, the display capacity can be increased depending upon the number of liquid crystal panel sets without increasing the number of scanning electrodes. Moreover, the above-mentioned examples only disclose a matrix drive type liquid crystal display apparatus, this invention is applied to an active matrix type liquid crystal display apparatus in which an angle of twist of the liquid crystal molecules is about 90°. In this case, the display element is constructed such as that shown in FIG. 3f so as to achieve the same effect as mentioned above.

In fact, a two-layered type STN liquid crystal panel that has picture elements of 640×400 dots and an angle of twist of 240° was employed to perform an image display, and it was found that an increase in opening ratio was about 40% in comparison with the liquid crystal panel of a conventional electrode pattern and the brightness was also improved with an increase in the opening ratio. Thus, the resulting image was excellent.

As mentioned above, the portions of a plural of liquid crystal panels of the projection liquid crystal display apparatus of the present invention to which voltage is applied are not superposed on each other in the light transmitting direction. As a result, the display capacity can be increased without increasing the number of scanning electrodes. Moreover, the electrodes are disposed in a zigzag manner, and a gap between the adjacent picture elements in a state that a display is carried out is eliminated, so that the opening ratio of the picture elements becomes high and an image display that is bright and superior in contrast can be performed. The resolution of the image is also high.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A projection type liquid crystal display apparatus comprising at least one display element unit, each display element unit including two adjacent laminated liquid crystal panels, each of said liquid crystal panels having a twisted nematic type liquid crystal layer;

a plurality of signal and scanning electrodes, each of said signal electrodes having square portions which are connected to each other by means of thin wire, each of said square portions shifting form each corresponding square portion of adjacent signal electrodes to an extent corresponding to one square portion in the extending direction of each signal electrode, and each of said scanning electrodes being disposed in a zigzag manner so as to face said signal electrodes with said liquid crystal layer sandwiched therebetween and so as to extend perpendicularly to and to intersect each signal electrode, the intersection portion being equal to said square portion; said signal and scanning electrodes forming a matrix of elements, such that said elements can be activated by the application of a voltage to corresponding signal and scanning electrodes, elements which can be activated constituting picture elements, said picture elements being disposed such that longitudinally and latitudinally adjacent to each picture element of one liquid crystal panel are picture elements of the other liquid crystal panel; and voltage applying means for selectively applying a voltage to said signal and scanning electrodes to modulate light passing through said picture elements of each of said liquid crystal layers;

wherein the twisting direction of the liquid crystal molecules of one liquid crystal layer is opposite to that of the liquid crystal molecules of the other liquid crystal layer; the liquid crystal molecules of each liquid crystal layer nearest the other liquid crystal layer are oriented perpendicular to the liquid crystal molecules of the other layer nearest the first one.

2. A projection type liquid crystal display apparatus according to claim 1, wherein each of said liquid crystal panels comprises a liquid crystal layer sandwiched between a pair of transparent substrates, said signal electrodes being disposed to extend in the same direction on one of the substrates, said scanning electrodes being disposed on the other substrate so as to perpendicularly intersect said signal electrodes.

3. A projection type liquid crystal display apparatus according to claim 1, wherein said square portions of said signal electrodes are electrode portions that are spaced at a predetermined interval in the extending direction of said signal electrodes and are shaped into the shape of one picture element unit; and each electrode portion of said signal electrodes shifts from each of the corresponding electrode portions of the adjacent signal electrodes to an extent corresponding to one picture element unit in the extending direction of said signal electrodes.

4. A projection type liquid crystal display apparatus according to claim 1, wherein said picture elements of each liquid crystal panel are offset from those of each other so as not to be superposed on each other.

5. A projection type liquid crystal display apparatus according to claim 1, wherein said picture elements of each liquid crystal panel are only diagonally adjacent to each other.

6. A projection type liquid crystal display apparatus according to claim 1, wherein the number of said display element units is one, whereby a black-and-white display is performed.

7. A projection type liquid crystal display apparatus according to claim 1, wherein the number of said display element units is three, each unit having a pair of liquid crystal panels, whereby a color display is performed.

8. A projection type liquid crystal display apparatus according to claim 1, including three display element units, each display element unit projecting a different color, respectively.

9. A liquid crystal projector comprising:
a light source;
a liquid crystal display element including a pair of liquid crystal panels; each of said panels including a layer of twisted nematic liquid crystal material sandwiched between a pair of transparent substrates, one of said transparent substrates having signal electrodes disposed on its interior face and the other of said transparent substrates having scanning electrodes on its interior face; said signal and scanning electrodes forming a matrix of elements such that said elements can be activated by the application of a voltage to corresponding signal and scanning electrodes, elements which can be activated constituting picture elements; said picture elements of one panel being offset from the picture elements of the same area of the other panel such that the picture elements of different panels are not superimposed upon each other in the light transmitting direction and that said picture elements of one panel almost occupy the spaces between the picture elements of the other panel;
and the liquid crystal molecules of each panel adopting a twist which is opposite in direction to that of the other panel in the absence of an applied voltage with the liquid crystal molecules of each liquid crystal panel nearest the other liquid crystal panel being oriented perpendicular to the liquid crystal molecules of the other panel nearest the first one;
a lens for directing substantially parallel light from said light source to said liquid crystal display element; and
voltage supply means for applying a voltage to selected signal and scanning electrodes to modulate light.

* * * * *